United States Patent
Emori et al.

(10) Patent No.: US 6,934,681 B1
(45) Date of Patent: Aug. 23, 2005

(54) SPEAKER'S VOICE RECOGNITION SYSTEM, METHOD AND RECORDING MEDIUM USING TWO DIMENSIONAL FREQUENCY EXPANSION COEFFICIENTS

(75) Inventors: Tadashi Emori, Tokyo (JP); Koichi Shinoda, Tokyo (JP)

(73) Assignee: NEC Corporation, Tokyo (JP)

( * ) Notice: Subject to any disclaimer, the term of this patent is extended or adjusted under 35 U.S.C. 154(b) by 632 days.

(21) Appl. No.: 09/695,067

(22) Filed: Oct. 25, 2000

(30) Foreign Application Priority Data

Oct. 26, 1999 (JP) .......................................... 11-304685

(51) Int. Cl.⁷ .............................................. G10L 17/00

(52) U.S. Cl. ...................................... 704/250; 704/246

(58) Field of Search ................................ 704/236, 238, 704/240, 241, 244, 250, 255

(56) References Cited

U.S. PATENT DOCUMENTS

| | | | | |
|---|---|---|---|---|
| 5,268,990 A | * | 12/1993 | Cohen et al. ................ | 704/200 |
| 5,390,278 A | * | 2/1995 | Gupta et al. ................. | 704/243 |
| 5,625,747 A | * | 4/1997 | Goldberg et al. ............ | 704/243 |
| 5,625,749 A | * | 4/1997 | Goldenthal et al. ......... | 704/254 |
| 5,664,059 A | * | 9/1997 | Zhao ............................ | 704/254 |
| 5,737,490 A | * | 4/1998 | Austin et al. ................ | 704/256 |
| 5,742,928 A | * | 4/1998 | Suzuki ......................... | 704/239 |
| 5,864,809 A | * | 1/1999 | Suzuki ......................... | 704/254 |
| 6,236,963 B1 | * | 5/2001 | Naito et al. .................. | 704/241 |

FOREIGN PATENT DOCUMENTS

| | | |
|---|---|---|
| EP | 0 866 442 A3 | 9/1998 |
| EP | 0 886 442 A2 | 9/1998 |
| JP | 6-214596 | 8/1994 |

OTHER PUBLICATIONS

Tadashi Emori Koichi Shinoda, Vocal Tract Length Normalization Using Rapid Maximum–Likelihood Estimation for speech Recognition, pp. 49–54.

S. Umesh et al., "Frequency–Warping and Speaker–Normalization," *IEEE International Conference on Acoustics, Speech and Signal Processing*, vol. 2, pp. 983–986, Munich, Germany, (1997), © 1997 IEEE.

L. Lee et al., "A Frequency Warping Approach to Speaker Normalization," *IEEE Transactions on Speech and Audio Processing*, vol. 6, pp. 49–60, (1998), © 1998 IEEE.

T. Fukada et al., "Speaker Normalized Acoustic Modeling Based on 3–D Viterbi Decoding." *IEEE Conference*, vol. 23., pp., 437–440, (1998), © 1998 IEEE.

P. Zhan et al., "Speaker Normalization Based on Frequency Warping", 1997 IEEE, (Literature 2), pp. 1039–1042.

(Continued)

*Primary Examiner*—David L. Ometz
*Assistant Examiner*—Michael N. Opsasnick
(74) *Attorney, Agent, or Firm*—Foley & Lardner LLP

(57) ABSTRACT

A voice recognition system comprises an analyzer for converting an input voice signal to an input pattern including cepstrum, a reference pattern for storing reference patterns, an elongation/contraction estimating unit for outputting an elongation/contraction parameter in frequency axis direction by using the input pattern and the reference patterns, and a recognizing unit for calculating the distances between the converted input pattern from the converter and the reference patterns and outputting the reference pattern corresponding to the shortest distance as result of recognition. The elongation/contraction unit estimates an elongation/contraction parameter by using cepstrum included in the input pattern. The elongation/contraction unit does not have various values in advance for determining the elongation/contraction parameter, nor is it necessary for the elongation/contraction unit have to execute distance calculation for various values.

31 Claims, 7 Drawing Sheets

OTHER PUBLICATIONS

"Fundamentals of Voice Recognition", Part I, translated and edited by Yoshii, NTT Advanced Technology Co., Ltd., (Literature 3), pp. 62–63, 1995 (Japanese document with English translation).

A. V. Oppenheim et al., "Discrete Representation of Signals", Proceedings of IEEE, vol. 60:6, (Literature 4), pp. 681–691, 1972.

"Fundamentals of Voice Recognition", (Part II), translated and edited by Furui), NTT Advanced Technology Co., Ltd., (Literature 5), pp. 102–185, 1995 (Japanese document with English translation).

Li Lee et al., "A Frequency Warping Approach to Speaker Normalization," 1998, pp. 49–60.

Toshiaki Fukada et al., "Speaker Normalized Acoustic Modeling Based on 3–D Viterbi Decoding," 1998, pp. 437–440.

Maeda, et al., "Straight Voice Conversion Using Warping Along the Frequency Axis of the Spectrum," 1999, pp. 187–188.

Tokuda et al., "Voice Mel–Cepstrum Analysis Using Secondary Allpass Function Based Frequency Conversions," 1998, pp. 279–280.

Miyajima et al., "Speaker Recognition Based on Discriminative Feature Extraction—Optimization of Mel–Cepstral Features," 1999, pp. 1–8.

Umesh S., et al: "Frequency–warping and speaker–normalization" 1997 IEEE International Conference on Acoustics, Speech, and Signal Processing (Cat. No. 97CB36052), Munich, Germany, Apr. 21–24, 1997, pp. 983–986 vol. 2, XP002172330 1997, Los Alamitos, CA, USA, IEEE Comput. Soc. Press, USA ISBN: 0–8186–7919–0.

* cited by examiner

SPEAKER'S VOICE RECOGNITION SYSTEM, METHOD AND RECORDING MEDIUM USING TWO DIMENSIONAL FREQUENCY EXPANSION COEFFICIENTS

BACKGROUND OF THE INVENTION

The present invention relates to indefinite speaker's voice recognition system and method as well as acoustic model leaning method and recording medium with a voice recognition program recorded therein and, more particularly, to voice recognition system capable of normalizing speakers on frequency axis, learning system for normalization, voice recognition method, learning method for normalization and recording medium, in which a program for voice recognition and a learning program for normalization are stored.

Spectrum converters in prior art voice recognition systems are disclosed in, for instance, Japanese Patent Laid-Open No. 6-214596 (referred to as Literature 1) and Puming Zhan and Martin Westphalk, "Speaker Normalization Based on Frequency Warping", ICASSP, 1039–1042, 1997 (referred to as Literature 2).

For example, Literature 1 discloses a voice recognition system, which comprises a frequency correcting means for correcting the frequency characteristic of an input voice signal on the basis of a plurality of predetermined different frequency characteristic correction coefficients, a frequency axis converting means for converting the frequency axis of the input voice signal on the basis of a plurality of predetermined frequency axis conversion coefficients, a feature quantity extracting means for extracting the feature quantity of the input voice signal as input voice feature quantity, a reference voice storing means for storing a reference voice feature quantity, a frequency characteristic correcting means, a frequency axis converting means, a collating or collating the input voice feature quantity obtained as a result of processes in the frequency characteristic correcting means and the reference voice feature quantity stored in the reference voice storing means, a speaker adopting phase function and a voice recognition phase function being included in the voice recognition system. In the voice recognition process in this system, in the speaker adopting phase an unknown speaker's voice signal having a known content is processed in the frequency characteristic correcting means, frequency axis converting means and feature quantity extracting means for each of the plurality of different frequency characteristic correction coefficients and the plurality of different frequency axis conversion coefficients, the input voice feature quantity for each coefficient and a reference voice feature quantity of the same content as the above known content are collated with each other, and a frequency characteristic correction coefficient and a frequency axis conversion coefficient giving a minimum distance are selected. In the voice recognition phase, the input voice feature quantity is determined by using the selected frequency characteristic correction coefficient and frequency axis conversion coefficient and collated with the reference voice feature quantity.

In these prior art voice recognition systems, for improving the recognition performance the spectrum converter causes elongation or contraction of the spectrum of the voice signal on the frequency axis with respect to the sex, age, physical conditions, etc. of the individual speakers. For spectrum elongation and contraction on the frequency axis, a function, which permits variation of the outline of the elongation and contraction with an adequate parameter, is defined to be used for elongation or contraction of the spectrum of the voice signal on the frequency axis. The function which is used for elongating or contracting the spectrum of the voice signal on the frequency axis is referred to as "warping function", and the parameter for defining the outline of the warping function is referred to as "elongation/contraction parameter".

Heretofore, a plurality of warping parameter values are prepared as elongation/contraction parameter of the warping function ("warping parameter"), the spectrum of the voice signal is elongated or contracted on the frequency axis by using each of these values, an input pattern is calculated by using the elongated or contracted spectrum and used together with reference pattern to obtain distance, and the value corresponding to the minimum distance is set as warping parameter value at the time of the recognition.

The spectrum converter in the prior art voice recognition system, will now be described with reference to the drawings. FIG. 9 is a view showing an example of the construction of the spectrum converter in the prior art voice recognition system. Referring to FIG. 9, this spectrum converter in the prior art, comprises an FFT (Fast Fourier Transform) unit 301, an elongation/contraction parameter memory 302, a frequency converter 303, an input pattern calculating unit 304, a matching unit 306, a reference pattern unit 305 and an elongation/contraction parameter selecting unit 307. The FFT unit 301 cuts out the input voice signal for every unit interval of time and causes Fourier transform of the cut-out signal to obtain a frequency spectrum.

A plurality of elongation/contraction parameter values for determining the elongation or contraction of frequency are stored in the elongation/contraction parameter memory 302. The frequency converter 303 executes a frequency elongation/contraction process on the spectrum fed out from the FFT unit 301 using a warping function with the outline thereof determined by elongation/contraction parameter, and feeds out a spectrum obtained after the frequency elongation/contraction process as elongation/contraction spectrum. The input pattern calculating unit 304 calculates and outputs an input pattern by using the elongation/contraction spectrum fed out from the frequency converter 303. The input pattern represents, for instance, a parameter time series representing an acoustical feature such as cepstrum.

The reference pattern is formed by using a large number of input patterns and averaging phoneme unit input patterns belonging to the same class by a certain type of averaging means. For the preparation of the reference pattern, see "Fundamentals of Voice Recognition", Part I, translated and edited by Yoshii, NTT Advanced Technology Co., Ltd., 1995, pp. 63 (Literature 3).

Reference patterns can be classified by the recognition algorithm. For example, time series reference patterns with input patterns arranged in the phoneme time series order are obtainable in the case of DP (Dynamic Programming) matching, and status series and connection data thereof are obtainable in the HMM (hidden Markov Model) case.

The matching unit 306 calculates distance by using reference pattern 305 matched to the content of voice inputted to the FFT unit 301 and the input pattern. The calculated distance corresponds to likelihood in the HMM (hidden Marcov model)case concerning the reference pattern and to the distance of the optimum route in the DP matching case. The elongation/contraction parameter selecting unit 307 selects a best matched elongation/contraction parameter in view of matching property obtained in the matching unit 306.

FIG. 10 is a flow chart for describing a process executed in a prior art spectrum matching unit. The operation of the prior art spectrum matching unit will now be described with reference to FIGS. 9 to 10. The FFT unit 301 executes the FFT operation on voice signal to obtain the spectrum thereof (step D101 in FIG. 10). The frequency converter 303 executes elongation or contraction of the spectrum on the frequency axis by using input elongation/contraction parameter (D106) (step D102). The input pattern calculating unit 304 calculates the input pattern by using the frequency axis elongated or contracted spectrum (step D103). The matching unit 305 determines the distance between reference pattern (D107) and the input pattern (D104). The sequence of processes from step D101 to step D104, is executed for all the elongation/contraction parameter values stored in the elongation/contraction parameter memory 302 (step D105).

When 10 elongation/contraction parameter values are stored in the elongation/contraction parameter memory 302, the process sequence from step D101 to D104 is repeated 10 times to obtain 10 different distances. The elongation/contraction parameter selecting unit 307 compares the distances corresponding to all the elongation/contraction parameters, and selects the elongation/contraction parameter corresponding to the shortest distance (step D108).

However, the above prior art spectrum converter has the following problems.

The first problem is that increased computational effort is required in the elongation/contraction parameter value determination. This is so because in the prior art spectrum converter it is necessary to prepare a plurality of elongation/contraction parameter values and execute the FFT process, the spectrum frequency elongation/contraction process, the input pattern calculation repeatedly a number of times corresponding to the number of these values.

The second problem is that it is possible to fail to obtain sufficient effects of the frequency elongation and contraction on the voice recognition system. This is so because the elongation/contraction parameter values are all predetermined, and none of these values may be optimum to an unknown speaker.

SUMMARY OF THE INVENTION

The present invention was made in view of the above problems, and its main object is to provide voice recognition system and method and also recording medium, which permits calculation of the optimum elongation/contraction parameter value for each speaker with less computational effort and can thus improve performance. The above and other objects and features of the present invention will now become immediately apparent from the following description.

According to a first aspect of the present invention, there is provided a voice recognition system comprising a spectrum converter for elongating or contracting the spectrum of a voice signal on the frequency axis, the spectrum converter including: an analyzer for converting an input voice signal to an input pattern including cepstrum; a reference pattern memory with reference patterns stored therein; an elongation/contracting estimating unit for outputting an elongation/contraction parameter in the frequency axis direction by using the input pattern and the reference patterns; and a converter for converting the input pattern by using the elongation/contraction parameter.

According to a second aspect of the present invention, there is provided a voice recognition system comprising: an analyzer for converting an input voice signal to an input pattern including a cepstrum; a reference pattern memory for storing reference patterns; an elongation/contraction estimating unit for outputting an elongation/contraction parameter in the frequency axis direction by using the input pattern and reference patterns; a converter for converting the input pattern by using the elongation/contraction parameter; and a matching unit for computing the distances between the elongated or contracted input pattern fed out from the converter and the reference patterns and outputting the reference pattern corresponding to the shortest distance as result of recognition.

The converter executes the elongation or contraction of spectrum on frequency axis with warping function defining the form of elongation or contraction by carrying out the elongation or contraction in cepstrum space. The elongation/contraction estimating unit executes the elongation or contraction of spectrum on frequency axis with warping function defining the form of elongation or contraction by using estimation derived from the best likelihood estimation of HMM (hidden Marcov model) in cepstrum space.

According to a third aspect of the present invention, there is provided a reference pattern learning system comprising: a learning voice memory with learning voice data stored therein; an analyzer for receiving a learning voice signal from the learning voice memory and converting the learning voice signal to an input pattern including cepstrum; a reference pattern memory with reference patterns stored therein; an elongation/contraction estimating unit for outputting an elongation/contraction parameter in frequency axis direction by using the input pattern and the reference patterns; a converter for converting the input pattern by using the elongation/contraction pattern; a reference pattern estimating unit for updating the reference patterns stored in the reference pattern memory for the learning voice data by using the elongated or contracted input pattern fed out from the converter and the reference patterns; and a likelihood judging unit for monitoring distance changes by computing distances by using the elongated or contracted input pattern fed out from the converter and the reference patterns.

The converter executes the elongation or contraction of spectrum on frequency axis with warping function defining the form of elongation or contraction by carrying out the elongation or contraction in cepstrum space. The elongation/contraction estimating unit executes the elongation or contraction of spectrum on frequency axis with warping function defining the form of elongation or contraction by using estimation derived from the best likelihood estimation of HMM (hidden Marcov model) in cepstrum space.

According to a fourth aspect of the present invention, there is provided a voice quality converting system comprising; an analyzer for converting an input voice signal to an input pattern including a cepstrum; a reference pattern memory for storing reference patterns; an elongation/contraction estimating unit for outputting an elongation/contraction parameter in the frequency axis direction by using the input pattern and reference patterns; a converter for converting the input pattern by using the elongation/contraction parameter; and an inverse converter for outputting a signal waveform in time domain by inversely converting the time serial input pattern obtained after the elongation/contraction supplied from the converter.

According to a fifth aspect of the present invention, there is provided a recording medium for a computer constituting a spectrum converter by executing elongation or contraction of the spectrum of a voice signal on frequency axis, in which is stored a program for executing the following processes: (a) an analyzing process for converting an input voice signal to an input pattern including cepstrum; (b) an elongation/ contraction estimating process for outputting an elongation/contraction parameter in frequency axis direction by using the input pattern and reference patterns stored in a reference pattern memory; and (c) a converting process for converting the input pattern by using the elongation/contraction parameter.

According to a sixth aspect of the present invention, there is provided a recording medium for a computer constituting a system for voice recognition by executing elongation or contraction of the spectrum of a voice signal on frequency axis, in which is stored a program for executing the following processes: (a) an analyzing process for converting an input voice signal to an input pattern including cepstrum; (b) an elongation/contraction estimating process for outputting an elongation/contraction parameter in frequency axis direction by using the input pattern and reference patterns stored in a reference pattern memory; (c) a converting process for converting the input pattern by using the elongation/contraction parameter; and (d) a matching process for computing the distances between the elongated or contracted input pattern and the reference patterns and outputting the reference pattern corresponding to the shortest distance as result of recognition.

The converting process executes the elongation or contraction of spectrum on frequency axis with warping function defining the form of elongation or contraction by carrying out the elongation or contraction in cepstrum space. The elongation/contraction estimating process executes the elongation or contraction of spectrum on frequency axis with warping function defining the form of elongation or contraction by using estimation derived from the best likelihood estimation of HMM (hidden Marcov model) in cepstrum space.

According to a seventh aspect of the present invention, there is provided, in a computer constituting a system for learning reference patterns from learning voice data, a recording medium, in which is stored a program, for executing the following processes: (a) an analyzing process for receiving learning voice data from learning voice memory with learning voice data stored therein and converting the received learning voice data to an input pattern including cepstrum; (b) an elongation/contraction estimating process for outputting an elongation/contraction parameter in frequency axis direction by using the input pattern and the reference patterns stored in the reference pattern memory; (c) a converting process for converting the input pattern by using the elongation/contraction parameter; (d) a reference pattern estimating process for updating the reference patterns for the learning voice data by using the elongated or contracted pattern fed out in the converting process and the reference patterns and; (e) a likelihood judging process for calculating the distances between the elongated or contracted input pattern after conversion in the converting process and the reference patterns and monitoring changes in distance.

The converting process executes the elongation or contraction of spectrum on frequency axis with warping function defining the form of elongation or contraction by carrying out the elongation or contraction in cepstrum space. The elongation/contraction estimating process executes the elongation or contraction of spectrum on frequency axis with warping function defining the form of elongation or contraction by using estimation derived from the best likelihood estimation of HMM (hidden Marcov model) in cepstrum space.

According to an eighth aspect of the present invention, there is provided a recording medium for a computer constituting a spectrum conversion by executing elongation or contraction of the spectrum of a voice signal on frequency axis, in which is stored a program for executing the following processes: (a) an analyzing process for converting an input voice signal to an input pattern including cepstrum; (b) an elongation/contraction estimating process for outputting an elongation/contraction parameter in frequency axis direction by using the input pattern and reference patterns stored in a reference pattern memory; (c) a converting process for converting the input pattern by using the elongation/contraction parameter; and (d) an inverse converting process for outputting a signal waveform in time domain by inversely converting the time serial input pattern obtained after the elongation/contraction supplied from the converter.

According to a ninth aspect of the present invention, there is provided a spectrum converting method for elongating or contracting the spectrum of a voice signal on the frequency axis, comprising: a first step for converting an input voice signal to an input pattern including cepstrum; a second step for outputting an elongation/contraction parameter in the frequency axis direction by using the input pattern and the reference patterns stored in a reference pattern memory; and a third step for converting the input pattern by using the elongation/contraction parameter.

According to a tenth aspect of the present invention, there is provided a voice recognition method comprising: a first step for converting an input voice signal to an input pattern including a cepstrum; a second step for outputting an elongation/contraction parameter in the frequency axis direction by using the input pattern and reference patterns stored in a reference pattern memory; a third step for converting the input pattern by using the elongation/contraction parameter; and a fourth step for computing the distances between the elongated or contracted input pattern and the reference patterns and outputting the reference pattern corresponding to the shortest distance as result of recognition.

The e elongation or contraction of spectrum on frequency axis with warping function defining the form of elongation or contraction is executed by carrying out the elongation or contraction in cepstrum space. The elongation/contraction estimating process executes the elongation or contraction of spectrum on frequency axis with warping function defining the form of elongation or contraction by using estimation derived from the best likelihood estimation of HMM (hidden Marcov model) in cepstrum space.

According to an eleventh aspect of the present invention, there is provided a reference pattern learning method comprising: a first step for receiving a learning voice signal from the learning voice memory and converting the learning voice signal to an input pattern including cepstrum; a second step for outputting an elongation/contraction parameter in frequency axis direction by using the input pattern and the reference patterns stored in a reference pattern memory; a third step for converting the input pattern by using the elongation/contraction pattern; a fourth step for updating the reference patterns for the learning voice data by using the elongated or contracted input pattern and the reference patterns; and a fifth step for monitoring distance changes by computing distances by using the elongated or contracted input pattern and the reference patterns.

The third step executes the elongation or contraction of spectrum on frequency axis with warping function defining the form of elongation or contraction by carrying out the elongation or contraction in cepstrum space. The second step executes the elongation or contraction of spectrum on frequency axis with warping function defining the form of elongation or contraction by using estimation derived from the best likelihood estimation of HMM (hidden Marcov model) in cepstrum space.

According to a twelfth aspect of the present invention, there is provided a voice recognition method of spectrum conversion to convert the spectrum of a voice signal by executing elongation or contraction of the spectrum on frequency axis, wherein: the spectrum elongation or contraction of the input voice signal as defined by a warping function is executed on cepstrum, the extent of elongation or contraction of the spectrum on the frequency axis is determined with elongation/contraction parameter included in warping function, and an optimum value is determined as elongation/contraction parameter value for each speaker.

Other objects and features will be clarified from the following description with reference to attached drawings.

PREFERRED EMBODIMENTS OF THE INVENTION

Figure 1:
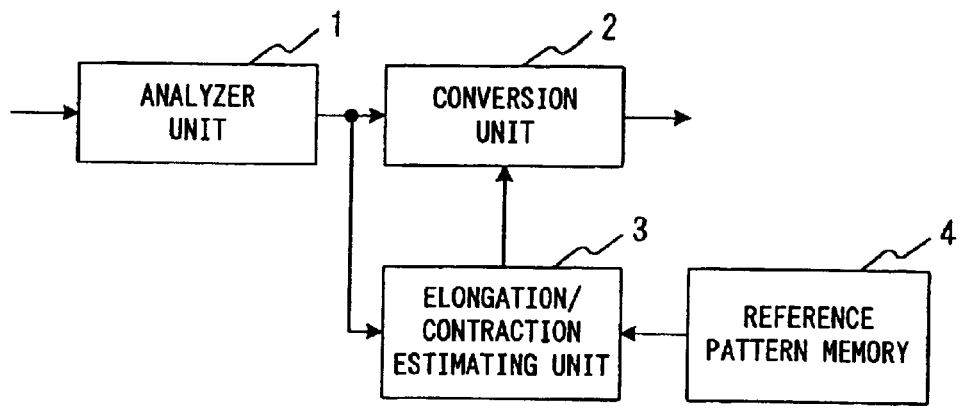
FIG. 1 is a view showing the construction of a spectrum converter in a first embodiment of the voice recognition system according to the present invention.

Embodiments of the present invention will now be described in detail with reference to the drawings.

A system according to the present invention generally comprises an analyzer unit 1 for converting an input voice signal to an input pattern containing cepstrum, an elongation/contraction estimating unit 3 for outputting an elongation/contraction parameter in the frequency axis direction by using an input pattern and a reference pattern, and a converter unit 2 for converting an input pattern by using an ion/contraction parameter.

The system further comprises a matching unit (i.e., recognizing unit 101) for calculating the distance between the input pattern converted by the converter 2 and reference patterns and outputting the reference pattern corresponding to the shortest distance as result of recognition.

The elongation/contraction estimating unit 3 estimates an elongation/contraction parameter by using a cepstrum contained in the input pattern. Thus, according to the present invention it is not necessary to store various values in advance when determining the elongation/contraction parameter. Neither it is necessary to execute distance calculation in connection with various values.

Furthermore, the system according to the present invention comprises a leaning voice memory 201 for storing learning voices, an analyzer 1 for receiving the leaning voice data from the learning voice memory 201 and converting the received data to input pattern including cepstrum, a reference pattern memory 4 for storing reference patterns, an elongation/contraction estimating unit 3 for outputting an elongation/contraction parameter in the frequency axis direction by using the input pattern and the reference pattern, a converter 2 for converting an input pattern by using the elongation/contraction parameter, a reference pattern memory for storing the reference patterns, a reference pattern estimating unit 202 for updating the reference pattern for voice for learning by utilizing the input pattern after elongation or contraction fed out from the converter and the reference patterns, and a likelihood judging unit 203 for computing the distance by utilizing the input pattern after elongation or contraction and the reference patterns and monitoring changes in the distance.

FIG. 1 is a view showing the construction of a spectrum converter in a first embodiment of the voice recognition system according to the present invention. Referring to FIG. 1, the spectrum converter in the first embodiment of the voice recognition system comprises an analyzer 1, a converter 2, an elongation/contraction estimating unit 3 and a reference pattern memory 4.

The analyzer 1 cuts out a voice signal for every predetermined interval of time, obtains the spectrum component of the cut-out signal by using FFT (Fast Fourier Transform) or LPC (Linear Predictive Coding) analysis, obtains a melcepstrum for extracting the envelope component of the melspectrunm component through conversion to melscale taking the human acoustical sense into account, and feeds out the melcepstrum, the change therein, the change in the change, etc. as input pattern. The converter 2 executes elongation or contraction of frequency by converting the melcepstrum in the input pattern. An example of conversion executed in the converter 2 will now be described in detail.

According to Oppenheim "Discrete Representation of Signals", Proc. IEEE, 60, 681–691, June 1972 (Literature 4), the frequency conversion with a primary full band-pass filter as represented by Formula (1) given below, can be expressed by Formula (2) as a recursive expression using cepstrum (symbol c and subscripts being dimension numbers of cepstrum).

$$\hat{z}^{-1} = \frac{Z^{-1} - \alpha}{1 - \alpha Z^{-1}} \quad (1)$$

$$\hat{c}_m^{(i)} = \begin{cases} C_{-i} + \alpha \hat{c}_0^{(i-1)}, & m = 0 \\ (1-\alpha^2)\hat{c}_{m-1}^{(i-1)} + \alpha \hat{c}_1^{(i-1)}, & m = 1 \\ \hat{c}_{m-1}^{(i-1)} + \alpha(\hat{c}_m^{(i-1)} - \hat{c}_{m-1}^{(i)}), & m \geq 2 \end{cases}$$

$$i = -\infty, \ldots, -1, 0. \quad (2)$$

The conversion in the cepstrum space given by Formula (2) is equivalent to the frequency of the spectrum given by Formula (1). Accordingly, the converter 102 executes elongation or contraction of the spectrum frequency without direct use of the spectrum but by executing the conversion given by Formula (2) derived from Formula (1) on the input pattern with Formula (1) as warping function and with α in Formula (1) as elongation/contraction parameter. The input pattern obtained after the conversion is fed out as converted input pattern.

Reference patterns are stored in the reference pattern memory 4. The reference patterns can be substituted for by hidden Marcov models (or HMMs) or time series reference patterns such as phoneme time series as phonetic data in units of words or phonemes. In this embodiment, the reference patterns are HMMs. Data constituting HMM may be the average vector in continuous Gauss distribution, variance, inter-state transition probability, etc.

The elongation/contraction estimating unit (or also referred to as elongation/contraction parameter estimating unit) 3, obtains alignment of the input pattern by using HMM corresponding to the voice signal inputted to the analyzer 1. By the term "alignment" is meant the post-probability at each instant and in each state of HMM.

The alignment may be obtained by using such well-known method as Viterbi algorithm and forward/backward algorithm described in "Fundamentals of Voice Recognition (Part II), translated and edited by Furui, NTT Advanced Technology Co., Ltd., 1995, pp. 102–185 (Literature 5).

The elongation/contraction parameter is calculated by using the obtained alignment, the HHM and the input pattern. The elongation/contraction parameter is calculated by using Formula (4).

$$\hat{C}_0 = \sum_{m=0}^{\infty} \alpha^m C_m,$$

$$\hat{C}_1 = (1 - \alpha^2) \sum_{m=1}^{\infty} m \alpha^{m-1} C_m,$$

$$\hat{C}_2 = C_2 + \alpha(-C_1 + 3C_3) + \qquad (3)$$
$$\alpha^2(-4C_2 + 6C_4) + \ldots \alpha^3(C_1 - 9C_3 + 10C_5) + \ldots,$$

$$\hat{C}_3 = C_3 + \alpha(-2C_2 + 4C_4) + \alpha^2(C_1 - 9C_3 + 10C_5) +$$
$$\alpha^3(6C_2 - 24C_4 + 20C_6) + \ldots,$$

$$\hat{C}_m = C_m + \begin{cases} (m+1)C_{m+1}\alpha, & m = 0 \\ \{(m+1)C_{m+1} - (m-1)C_{m-1}\}\alpha, & m > 0 \end{cases} \qquad (4)$$

Formula (4) is derived by developing the recursive equation of Formula (2) with respect to the elongation/contraction parameter as in Formula (3), approximating the result of development with the first degree term of $\alpha$, introducing the result in Q function of HMM for likelihood estimation as described in Literature 4 and maximizing the Q function.

The function thus derived is given by Formula (5).

$$\alpha = \frac{\sum_{t=1}^{r} \gamma_t(j,k) \left( \sum_{m=1}^{M} \frac{1}{\sigma_m^2} \Delta C_{mI} \overline{C}_{mt} \right)}{\sum_{t=1}^{r} \gamma_t(j,k) \left( \sum_{m=1}^{M} \frac{1}{\sigma_m^2} \overline{C}_{mI}^2 \right)} \qquad (5)$$

$$\Delta C_{mI} = C_{mt} - \mu_{jkm},$$

$$\overline{C}_{mI} = (m-1)C_{(m-1)t} - (m+1)C_{(m+1)t}$$

In Formula (5), c represents the melcepstrum part of the above input pattern, $\mu$ represents the average vector of HMM, $\sigma$ represents the variation of HMM, and $\gamma$ represents the post-probability at instant t and in state j and mixed state k as alignment data.

The post-probability is presence probability at a certain instant and in a certain state in the case of the forward/backward algorithm, and in the case of Viterbi algorithm it is "1" in the case of presence in an optimum route at a certain instant and in a certain time and "0" otherwise.

While Formula (1) was given as the warping function in this embodiment, it is by no means limitative, and according to the present invention it is possible to adopt any formula. Also, while the first degree approximation of Formula (2) was used to derive Formula (5), it is also possible to use second and higher degree approximations.

Figure 2:
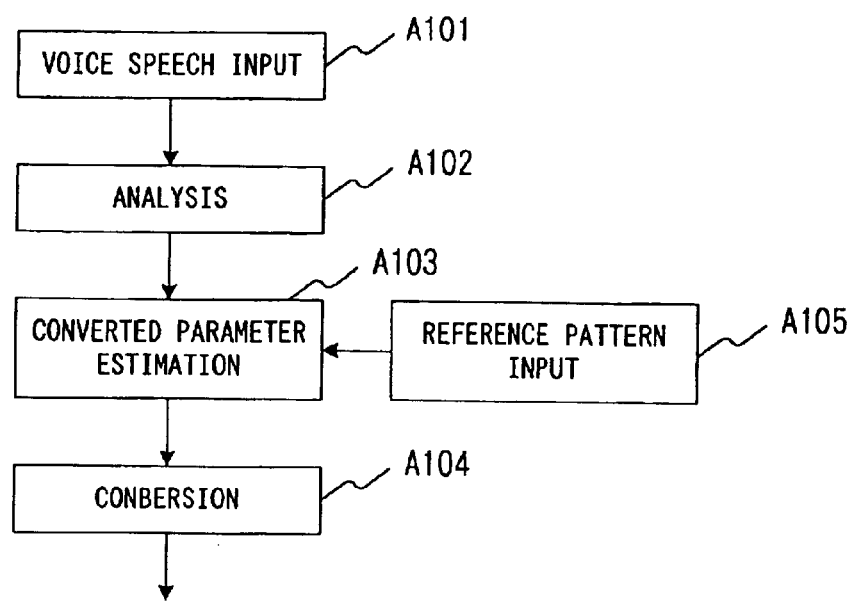
FIG. 2 is a flow chart for explaining the process in the first embodiment of the present invention.

FIG. 2 is a flow chart for explaining the process in the first embodiment of the present invention. The overall operation of the first embodiment will now be described in detail with reference to FIGS. 1 and 2. Subsequent to the input of a voice signal (step A101 in FIG. 2), the analyzer 1 calculates the input pattern (A102). Then, the elongation/contraction estimating unit 3 calculates the elongation/contraction pattern by using the input pattern fed out from the analyzer 1 and inputted HMM (A105) (step A103). Then, the converter 2 obtains converted input pattern from the input pattern from the analyzer 1 by using the conversion function of either one of Formulas (2) to (4) (step A104). The value of $\alpha$ is "0" in the case of the first utterance, while using values fed out from the elongation/contraction estimating unit 3 as $\alpha$ in the cases of the second and following utterances.

The first embodiment of the present invention has the following effects. In the first embodiment, the input pattern fed out from the analyzer 1 is inputted to the converter 2, and the spectrum frequency elongation and contraction may be executed in a melcepstrum range. Where Formula (5) is used, repeat calculation as described before in the prior art is unnecessary, and analysis and other processes need be executed only once. It is thus possible to reduce computational effort for the elongation/contraction parameter estimation.

Figure 3:
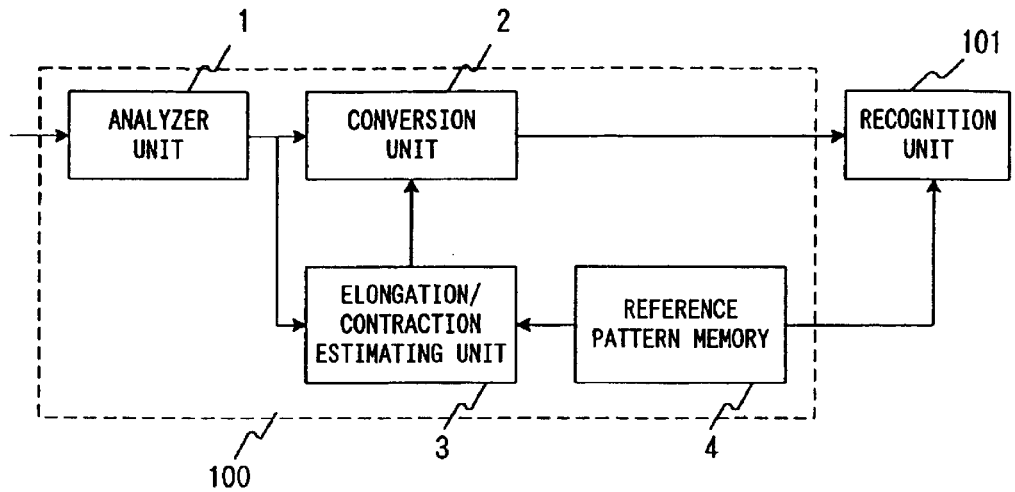
FIG. 3 is a view showing the construction of the second embodiment of the present invention.

A second embodiment of the present invention will now be described. FIG. 3 is a view showing the construction of the second embodiment of the present invention. The second embodiment of the voice recognition system comprises an analyzer 1, converter 2, an elongation/contraction estimating unit 3, a recognizing unit 101 and a reference pattern memory 4. The analyzer 1, a converter 2, elongation/contraction estimating unit 3 and reference pattern memory 4 are the same as those described before in the description of the first embodiment. Specifically, like the first embodiment, the analyzer 1 analyzes the voice signal, and then calculates and feeds out the input pattern. Also like the first embodiment, the converter 2 converts the input pattern, and feeds out the converted input pattern. Furthermore, like the first embodiment, HMM constituted by average vector of the input pattern, variance, etc. is stored as elements representing phoneme in the reference pattern memory 4.

The recognizing unit (or matching unit) 101 executes recognition by checking which HMM is well matched to the converted input pattern fed out from the converter. The matching is executed by such as well-known method as Viterbi algorithm or forward/backward algorithm shown in Literature 4.

Figure 4:
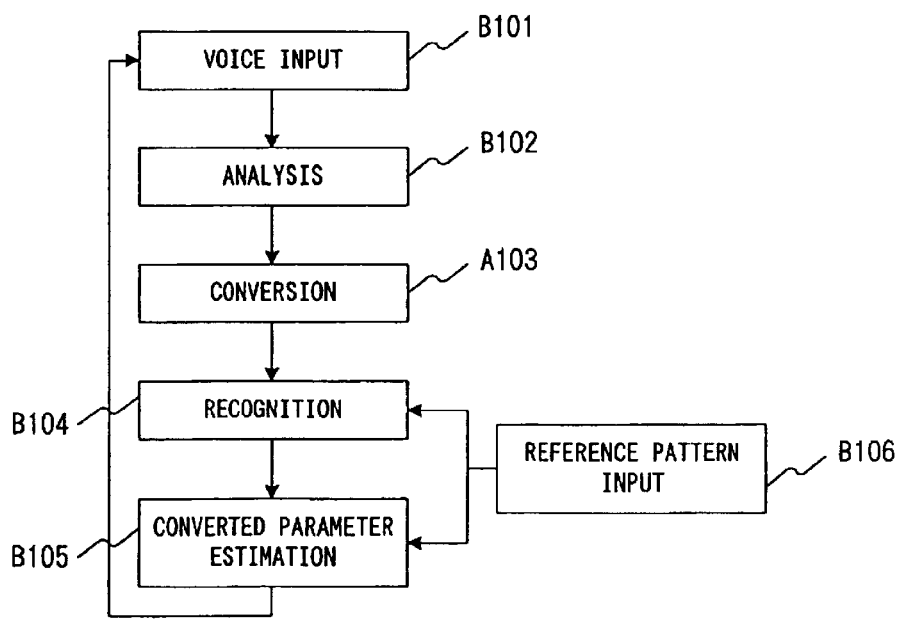
FIG. 4 is a flow chart for describing the process sequence in the second embodiment of the present invention.

FIG. 4 is a flow chart for describing the process sequence in the second embodiment of the present invention. Referring to FIGS. 3 and 4, the overall operation of the second embodiment of the present invention will be described in detail.

The analyzer 1 analyzes the input voice signal 26 (step B101 in FIG. 4) and calculates the input pattern (step B102). The converter 2 obtains the converted pattern from the input pattern fed out from the analyzer 1 by using the conversion function of either one of Formulas (2) to (4) (step B103).

The value of α is "0" in the case of the first voice, while warping parameter values fed out from the elongation/contraction estimating unit 3 are used as α in the cases of the second and following voices. Then, the recognizing unit 101 executes a recognizing process by using the converted input pattern (step B104). At this time, HMM is inputted from the reference pattern memory 4 to the recognizing unit 101 (step B106). Subsequent to the recognizing process, the elongation/contraction parameter estimating unit 3 calculates the elongation/contraction parameter is calculated (step B105). Thereafter, the process is repeated from the voice input process in step B101 by using the elongation/contraction parameter obtained and the step B105.

The second embodiment has the following functional effect. The second embodiment of the present invention comprises the spectrum converter 100 and the recognizing unit 101 in the first embodiment. Thus, whenever the voice signal is inputted, the value of the elongation/contraction parameter is updated, and it is possible to correct frequency deviation with respect to the reference pattern. The recognition performance is thus improved.

In addition, in the second embodiment of the present invention the elongation/contraction parameter estimation is executed by using Formula (5) for making the HMM maximum likelihood estimation Q function minimum. Thus, the elongation/contraction parameter estimation can be obtained as continuous values, and it is thus possible to expect recognition performance improvement compared to the case of using preliminarily prepared discrete values.

Figure 5:
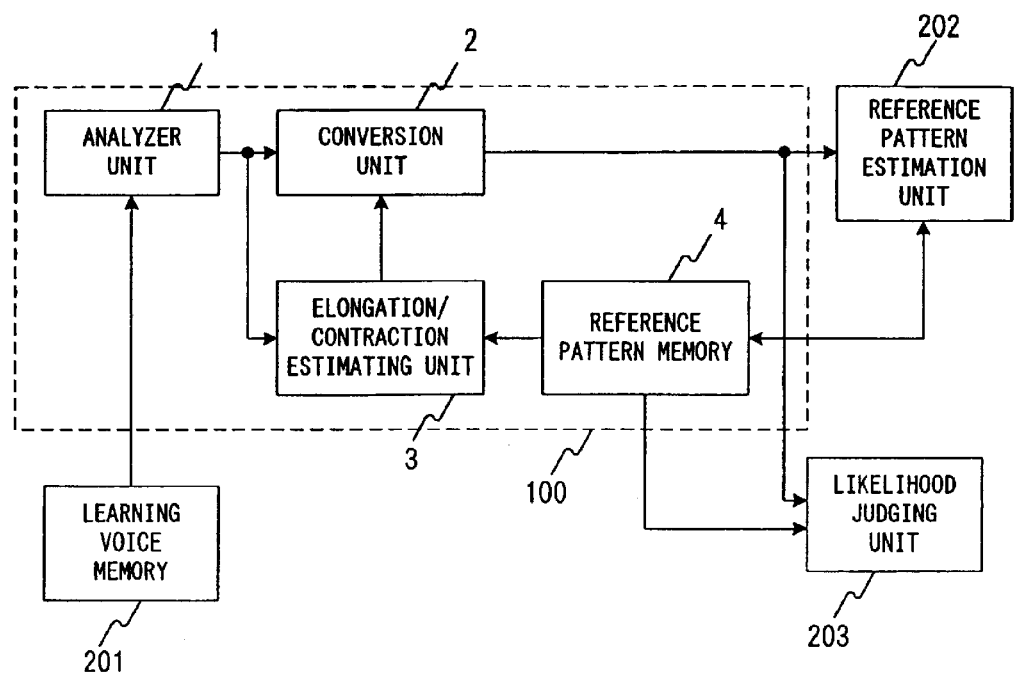
FIG. 5 is a view showing the construction of the third embodiment of the present invention.

A third embodiment of the present invention will now be described. FIG. 5 is a view showing the construction of the third embodiment of the present invention. Referring to FIG. 5, in the third embodiment the present invention is applied to a pattern learning system, which comprises a learning voice memory 201, a reference pattern estimation unit 202 and a likelihood judging unit 203 in addition to the spectrum converter 100 in the first embodiment.

The learning voice memory 201 stores voice signals used for learning HMM. The reference pattern estimating unit 20 estimates HMM parameter by using converted input pattern fed out from the spectrum converter 100 and HMM. The estimation may be best likelihood estimation as described in Literature 4. The likelihood judging unit 203 obtains distances corresponding to all learning voice signals by using the converted input pattern fed out from the spectrum converter 100 and HMM. Where the reference patterns are those in the HMM case, the distance is obtained by using such a method as Viterbi algorithm or forward/backward algorithm as described in Literature 5.

While the third embodiment of the present invention has been described in connection with the learning of HMM, the present invention is applicable to the learning of any parameter concerning voice recognition.

Figure 6:
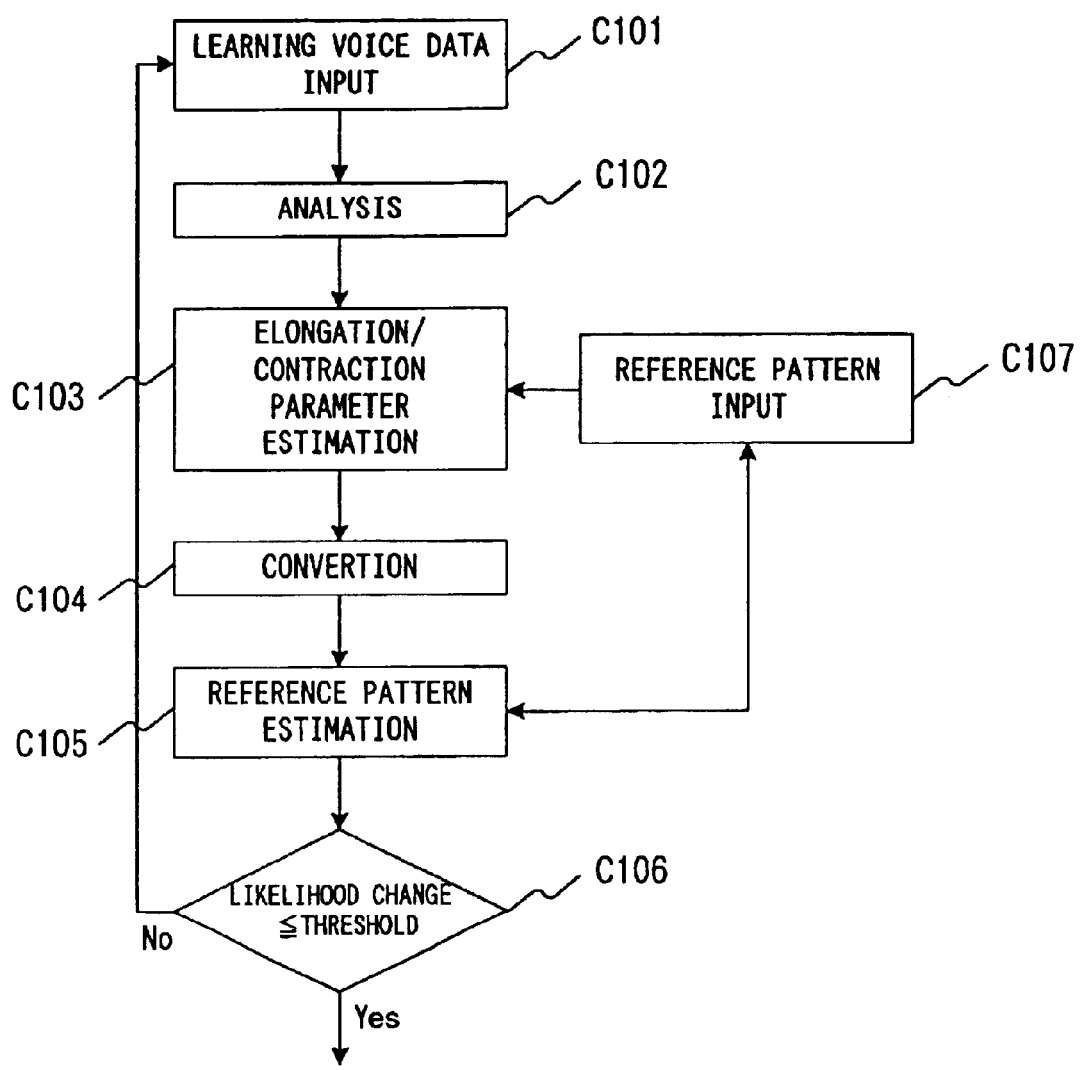
FIG. 6 is a flow chart for describing the process in the third embodiment of the present invention

FIG. 6 is a flow chart for describing the process in the third embodiment of the present invention. The entire operation of the third embodiment of the present invention will now be described in detail with reference to FIGS. 5 and 6. First, a learning voice signal is inputted to the spectrum analyzer 1 in the spectrum converter 100 (step C101 in FIG. 6). The analyzer 1 analyzes the learning voice signal and feeds out an input pattern (step C102). The elongation/contraction estimating unit 3 estimates the elongation/contraction parameter (step C103). The converter 2 executes input pattern conversion and feeds out a converted input pattern (step C104). The reference pattern estimating unit 202 executes HMM estimation by using the converted input pattern and HMM (step C105). The likelihood judging unit 203 obtains likelihood corresponding to all the voice signals, and compares the change in likelihood and a threshold (C106). When the change in likelihood is less than the threshold, the reference pattern memory 4 is updated with the HMM estimated in the reference pattern estimating unit 202, thus bringing an end to the learning. When the change in likelihood is greater than the threshold, the likelihood judging unit 203 updates the reference pattern memory 4 with HMM estimated by the reference pattern estimating unit 202, and the sequence of processes is repeated from the learning voice data input process (C101).

The third embodiment of the present invention has the following effects. In the third embodiment of the present invention, when learning a reference pattern obtained for each speaker after correction of the effects of frequency elongation and contraction with a warping function, the elongation/contraction parameter estimation can be executed during the learning process. Thus, it is possible to reduce the computational effort compared to the prior art. In addition, Formula (5) used for the elongation/contraction parameter estimation is derived by using the best likelihood of HMM, and like other HMM parameter estimation cases it can be readily adapted for use in the course of learning.

Figure 7:
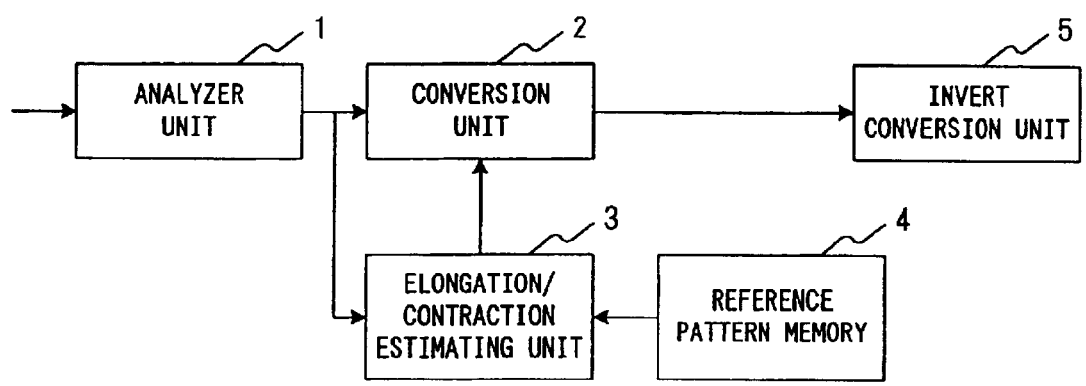
FIG. 7 is a view showing the construction of the fourth embodiment of the present invention.

A fourth embodiment of the present invention will now be described. FIG. 7 is a view showing the construction of the fourth embodiment of the present invention. Referring to FIG. 7, the fourth embodiment of the present invention comprises an inverse converter 45 in addition to the construction of the first embodiment. The inverse converter 5 executes voice quality conversion by inversely converting the elongated or contracted input pattern time series fed out from the converter 2 and outputting a signal waveform in time domain.

Figure 8:
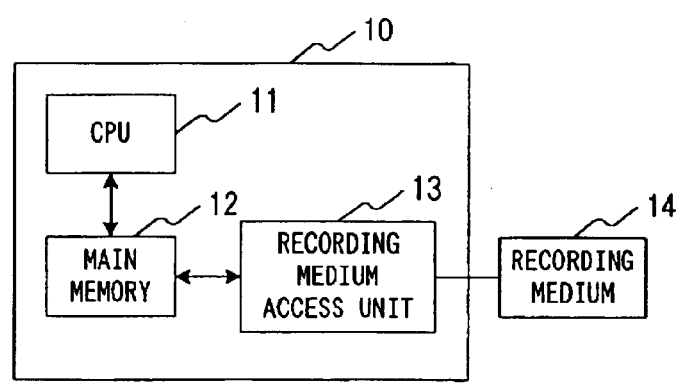
FIG. 8 is a view showing the construction of the fifth embodiment of the present invention.
Figure 9:
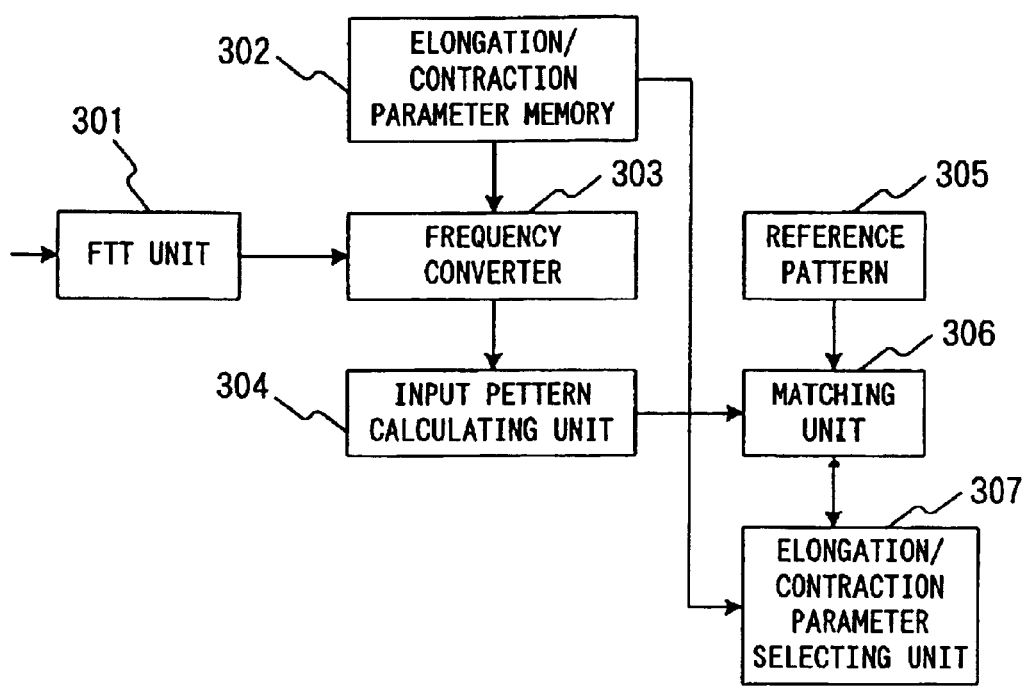
FIG. 9 is a view showing an example of the construction of the spectrum converter in the prior art voice recognition system.
Figure 10:
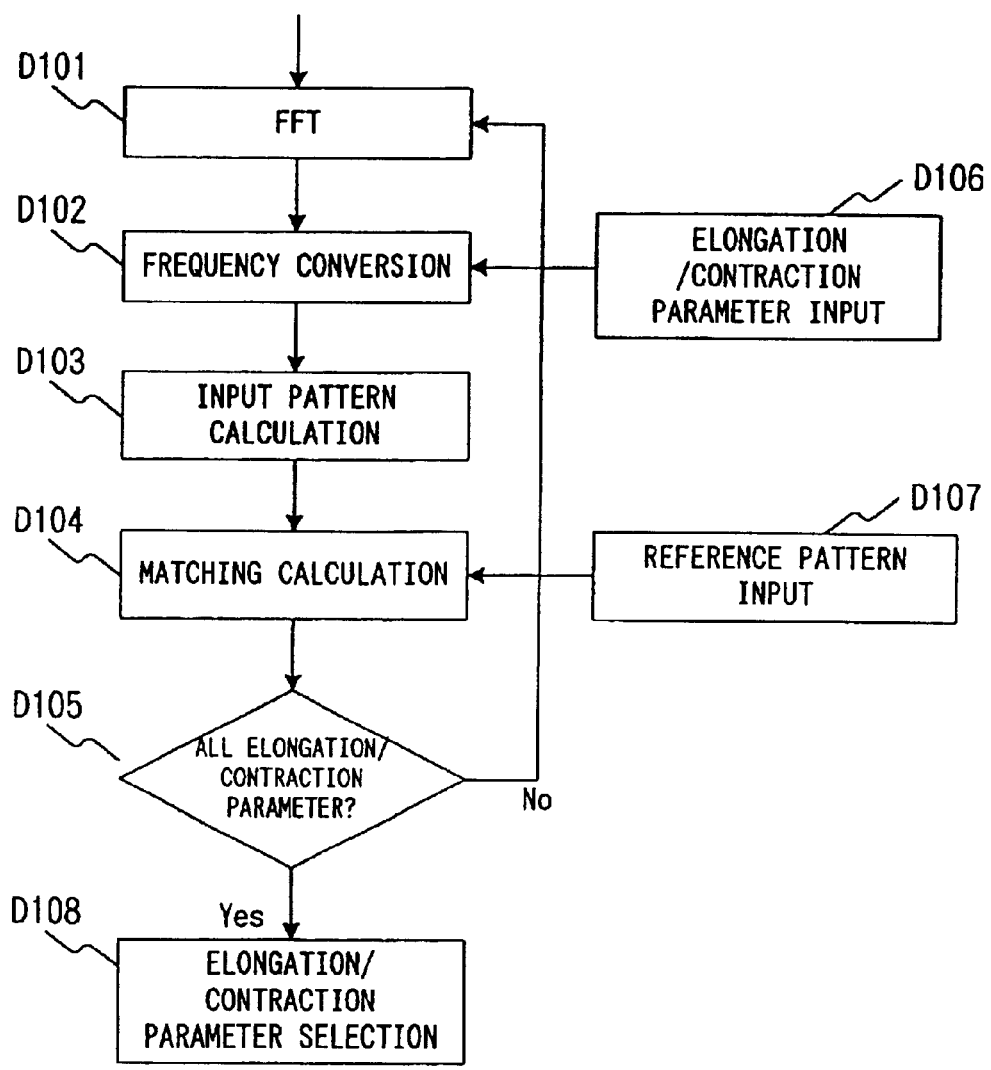
FIG. 10 is a flow chart for describing a process executed in a prior art spectrum matching unit.

A fifth embodiment of the present invention will now be described. FIG. 8 is a view showing the construction of the fifth embodiment of the present invention. In the fifth embodiment of the present invention, the above first to fourth embodiments of systems are realized program control executed with a computer. Referring to FIG. 8, in the case of realizing the processes in the analyzer 1, the converter 2 and the elongation/contraction estimating unit 3 shown in FIG. 1 by executing program on a computer 10, the program is loaded from a recording medium 14, such as CD-ROM, DVD, FD, Magnetic tape, etc. via a recording medium accessing unit 13 in a main memory 12 of the computer 10, and is executed in a CPU 11. In the recording medium 14 is stored a program for executing, with the computer, an analysis process for converting an input voice signal to an input pattern including cepstrum, an elongation/contraction estimating process for outputting an elongation/contraction parameter in the frequency axis direction by using the input pattern and the reference pattern stored in a reference pattern memory.

Alternatively, it is possible to record a program, for causing execution, with a computer, a matching process of computing the distance between the input pattern fed out after elongation or contraction and each reference pattern and outputting the reference pattern corresponding to the shortest distance as result of recognition.

A program for causing execution, with the computer, the matching processing for the distance calculation between the input pattern after the elongation/contraction and the reference pattern, and outputting the reference pattern having the minimum distance as a recognition result, may be recorded in the recording medium.

As a different alternative, it is possible to store in the recording medium 14 a program for causing execution, with the computer, an analysis process for converting a learning voice data stored in a learning voice memory for storing learning voice data to an input pattern containing cepstrum, an elongation/contraction estimating process for outputting an elongation/contraction parameter in the frequency axis direction by using the input pattern and the reference pattern stored in a reference pattern memory, a converting process for converting the input pattern by using the elongation/contraction parameter, a reference pattern estimating process for updating the reference pattern with respect to the learning voice by using elongated or contracted input pattern fed out after the conversion process and the reference patterns, and a likelihood judging process of monitoring changes in distance by computing the distance through utilization of the elongated or contracted input pattern and reference patterns. It will be seen that in the second to fourth embodiments it is possible to realize like program control. It is also possible to down-load program from a server (not shown) via a network or like transfer medium. In other words, as the recording medium may be used any recording medium, such as communication medium, so long as it can hold program.

As has been described in the foregoing, according to the present invention it is possible to obtain the following advantages.

A first advantage is to reduce computational effort required for the calculation of optimum parameter for recognition performance in the voice signal spectrum frequency elongation or contraction. This is so because according to the present invention it is adopted that the conversion in primary full band-pass or like filter process with respect to the frequency axis can be solved in the form of elongation/contraction parameter power series in cepstrum domain. Thus, when the series is approximated by a first degree function, a function of elongation/contraction parameter for minimizing the function for the best likelihood estimation can be described in a ready function to be used for calculation.

A second advantage is to make it possible to estimate elongation/contraction parameter simultaneously with other parameters at the time of the HMM learning. This is so because according to the present invention the function for calculating the elongation/contraction parameter is derived from the Q function for the best likelihood estimation in voice recognition.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A voice recognition system comprising a spectrum converter for elongating or contracting a spectrum of a voice signal on a frequency axis, the spectrum converter including:

an analyzer for converting an input voice signal to an input pattern including cepstrum;

a reference pattern memory with reference patterns stored therein;

an elongation/contracting estimating unit for outputting an elongation/contraction parameter in the frequency axis direction by using the input pattern and the reference patterns; and a converter for converting the input pattern by using the elongation/contraction parameter;

wherein said elongating or contracting of the spectrum of the voice signal is carried out using an expansion-compression coefficient obtained by retrieval in two dimensional space such that one value of the coefficient is obtained for each utterance.

2. A voice recognition system comprising:

an analyzer for converting an input voice signal to an input pattern including a cepstrum;

a reference pattern memory for storing reference patterns;

an elongation/contraction estimating unit for outputting an elongation/contraction parameter in the frequency axis direction by using the input pattern and reference patterns;

a converter for converting the input pattern by using the elongation/contraction parameter; and a matching unit for computing the distances between the elongated or contracted input pattern fed out from the converter and the reference patterns and outputting the reference pattern corresponding to the shortest distance as result of recognition;

wherein said elongation/contraction parameter is based on an expansion-compression coefficient obtained by retrieval in two dimensional space such that one value of the coefficient is obtained for each utterance.

3. The voice recognition system according to claim 1, wherein the converter executes the elongation or contraction of the spectrum on the frequency axis with a warping function defining the form of elongation or contraction by carrying out the elongation or contraction in cepstrum space.

4. The voice recognition system according to claim 1, wherein the elongation/contraction estimating unit executes the elongation or contraction of the spectrum on the frequency axis with a warping function defining the form of elongation or contraction by using estimation derived from the best likelihood estimation of HMM (hidden Marcov model) in a cepstrum space.

5. A reference pattern learning system comprising:

a learning voice memory with learning voice data stored therein;

an analyzer for receiving a learning voice signal from the learning voice memory and converting the learning voice signal to an input pattern including cepstrum;

a reference pattern memory with reference patterns stored therein;

an elongation/contraction estimating unit for outputting an elongation/contraction parameter in a frequency axis by using the input pattern and the reference patterns;

a converter for converting the input pattern by using the elongation/contraction pattern;

a reference pattern estimating unit for updating the reference patterns stored in the reference pattern memory for the learning voice data by using the elongated or contracted input pattern fed out from the converter and the reference patterns; and a likelihood judging unit for monitoring distance changes by computing distances by using the elongated or contracted input pattern fed out from the converter and the reference patterns;

wherein said elongation/contraction parameter is based on an expansion-compression coefficient obtained by retrieval in two dimensional space such that one value of the coefficient is obtained for each utterance.

6. The reference pattern learning system according to claim 5, wherein the converter executes the elongation or contraction of spectrum on the frequency axis with a warping function defining the form of elongation or contraction by carrying out the elongation or contraction in cepstrum space.

7. The reference pattern learning system according to claim 5, wherein the elongation/contraction estimating unit executes the elongation or contraction of spectrum on the frequency axis with a warping function defining the form of elongation or contraction by using estimation derived from the best likelihood estimation of HMM (hidden Marcov model) in cepstrum space.

8. A voice quality converting system comprising:
   an analyzer for converting an input voice signal to an input pattern including a cepstrum;
   a reference pattern memory for storing reference patterns;
   an elongation/contraction estimating unit for outputting an elongation/contraction parameter in the frequency axis direction by using the input pattern and reference patterns;
   a converter for converting the input pattern by using the elongation/contraction parameter; and
   an inverse converter for outputting a signal waveform in time domain by inversely converting the time serial input pattern obtained after the elongation/contraction supplied from the converter
   wherein said elongation/contraction parameter is based on an expansion-compression coefficient obtained by retrieval in two dimensional space such that one value of the coefficient is obtained for each utterance.

9. A recording medium for a computer constituting a spectrum converter by executing elongation or contraction of the spectrum of a voice signal on frequency axis, in which is stored a program for executing the following processes:
   (a) an analyzing process for converting an input voice signal to an input pattern including cepstrum,
   (b) an elongation/contraction estimating process for outputting an elongation/contraction parameter in frequency axis direction by using the input pattern and reference patterns stored in a reference pattern memory; and
   (c) a converting process for converting the input pattern by using the elongation/contraction parameter
   wherein said elongation/contraction parameter is based on an expansion-compression coefficient obtained by retrieval in two dimensional space such that one value of the coefficient is obtained for each utterance.

10. A recording medium for a computer constituting a system for voice recognition by executing elongation or contraction of a spectrum of a voice signal on a frequency axis, in which is stored a program for executing the following processes:
    (a) an analyzing process for converting an input voice signal to an input pattern including cepstrum,
    (b) an elongation/contraction estimating process for outputting an elongation/contraction parameter along the frequency axis by using the input pattern and reference patterns stored in a reference pattern memory;
    (c) a converting process for converting the input pattern by using the elongation/contraction parameter; and
    (d) a matching process for computing the distances between the elongated or contracted input pattern and the reference patterns and outputting the reference pattern corresponding to the shortest distance as result of recognition
    wherein said elongation/contraction parameter is based on an expansion-compression coefficient obtained by retrieval in two dimensional space such that one value of the coefficient is obtained for each utterance.

11. The recording medium according to claim 10, wherein the converting process executes the elongation or contraction of spectrum on the frequency axis with a warping function defining the form of elongation or contraction by carrying out the elongation or contraction in cepstrum space.

12. The recording medium according to claim 10, wherein the elongation/contraction estimating process executes the elongation or contraction of the spectrum on the frequency axis with a warping function defining the form of elongation or contraction by using estimation derived from the best likelihood estimation of HMM (hidden Marcov model) in cepstrum space.

13. In a computer constituting a system for learning reference patterns from learning voice data, a recording medium, in which is stored a program, for executing the following processes:
    (a) an analyzing process for receiving learning voice data from learning voice memory with learning voice data stored therein and converting the received learning voice data to an input pattern including cepstrum;
    (b) an elongation/contraction estimating process for outputting an elongation/contraction parameter along a frequency axis by using the input pattern and the reference patterns stored in the reference pattern memory;
    (c) a converting process for converting the input pattern by using the elongation/contraction parameter;
    (d) a reference pattern estimating process for updating the reference patterns for the learning voice data by using the elongated or contracted pattern fed out in the converting process and the reference patterns and;
    (e) a likelihood judging process for calculating the distances between the elongated or contracted input pattern after conversion in the converting process and the reference patterns and monitoring changes in distance
    wherein said elongation/contraction parameter is based on an expansion-compression coefficient obtained by retrieval in two dimensional space such that one value of the coefficient is obtained for each utterance.

14. The recording medium according to claim 13, wherein the converting process executes the elongation or contraction of the spectrum on the frequency axis with a warping function defining the form of elongation or contraction by carrying out the elongation or contraction in cepstrum space.

15. The recording medium according to claim 13, wherein the elongation/contraction estimating process executes the elongation or contraction of the spectrum on the frequency axis with a warping function defining the form of elongation or contraction by using estimation derived from the best likelihood estimation of HMM (hidden Marcov model) in cepstrum space.

16. A recording medium for a computer constituting a spectrum conversion by executing elongation or contraction of the spectrum of a voice signal on a frequency axis, in which is stored a program for executing the following processes:
    (a) an analyzing process for converting an input voice signal to an input pattern including cepstrum,
    (b) an elongation/contraction estimating process for outputting an elongation/contraction parameter along the frequency axis by using the input pattern and reference patterns stored in a reference pattern memory;

(c) a converting process for converting the input pattern by using the elongation/contraction parameter; and (d) an inverse converting process for outputting a signal waveform in time domain by inversely converting the time serial input pattern obtained after the elongation/contraction supplied from the converter wherein said elongation/contraction parameter is based on an expansion-compression coefficient obtained by retrieval in two dimensional space such that one value of the coefficient is obtained for each utterance.

17. A spectrum converting method for elongating or contracting a spectrum of a voice signal on a frequency axis, comprising:

a first step for converting an input voice signal to an input pattern including cepstrum;

a second step for outputting an elongation/contraction parameter in the frequency axis direction by using the input pattern and the reference patterns stored in a reference pattern memory; and a third step for converting the input pattern by using the elongation/contraction parameter wherein said elongation/contraction parameter is based on an expansion-compression coefficient obtained by retrieval in two dimensional space such that one value of the coefficient is obtained for each utterance.

18. A voice recognition method comprising:

a first step for converting an input voice signal to an input pattern including a cepstrum;

a second step for outputting an elongation/contraction parameter along a frequency axis by using the input pattern and reference patterns stored in a reference pattern memory;

a third step for converting the input pattern by using the elongation/contraction parameter; and a fourth step for computing the distances between the elongated or contracted input pattern arid the reference patterns and outputting the reference pattern corresponding to the shortest distance as result of recognition wherein said elongation/contraction parameter is based on an expansion-compression coefficient obtained by retrieval in two dimensional space such that one value of the coefficient is obtained for each utterance.

19. The voice recognition method according to claim 17, wherein the elongation or contraction of the spectrum on the frequency axis with a warping function defining the form of elongation or contraction is executed by carrying out the elongation or contraction in cepstrum space.

20. The voice recognition method according to claim 17, wherein the elongation/contraction estimating process executes the elongation or contraction of the spectrum on the frequency axis with a warping function defining the form of elongation or contraction by using estimation derived from the best likelihood estimation of HMM (hidden Marcov model) in cepstrum space.

21. A reference pattern learning method comprising:

a first step for receiving a learning voice signal from the learning voice memory and converting the learning voice signal to an input pattern including cepstrum;

a second step for outputting an elongation/contraction parameter alone a frequency axis by using the input pattern and the reference patterns stored in a reference pattern memory;

a third step for converting the input pattern by using the elongation/contraction pattern;

a fourth step for updating the reference patterns for the learning voice data by using the elongated or contracted input pattern and the reference patterns; and a fifth step for monitoring distance changes by computing distances by using the elongated or contracted input pattern and the reference patterns wherein said elongation/contraction parameter is based on an expansion-compression coefficient obtained by retrieval in two dimensional space such that one value of the coefficient is obtained for each utterance.

22. The reference pattern learning method according to claim 21, wherein the third step executes the elongation or contraction of the spectrum on the frequency axis with a warping function defining the form of elongation or contraction by carrying out the elongation or contraction in cepstrum space.

23. The reference pattern learning method according to claim 21, wherein the second step executes the elongation or contraction of the spectrum on the frequency axis with a warping function defining the form of elongation or contraction by using estimation derived from the best likelihood estimation of HMM (hidden Marcov model) in cepstrum space.

24. A voice recognition method of spectrum conversion to convert a spectrum of a voice signal by executing elongation or contraction of the spectrum on a frequency axis, wherein:

the or contraction of the spectrum of the voice signal is defined by a warping function and is executed on cepstrum, and the extent of elongation or contraction of the spectrum on the frequency axis is determined with an elongation/contraction parameter included in the warping function, and an optimum value is determined as elongation/contraction parameter value for each speaker wherein said elongation/contraction parameter is based on an expansion-compression coefficient obtained by retrieval in two dimensional space such that one value of the coefficient is obtained for each utterance.

25. The voice recognition system according to claim 2, wherein the converter executes the elongation or contraction of the spectrum on the frequency axis with a warping function defining the form of elongation or contraction by carrying out the elongation or contraction in cepstrum space.

26. The voice recognition system according to claim 2, wherein the elongation/contraction estimating unit executes the elongation or contraction of the spectrum on the frequency axis with a warping function defining the form of elongation or contraction by using estimation derived from the best likelihood estimation of HMM (hidden Marcov model) in cepstrum space.

27. The voice recognition system according to claim 3, wherein the elongation/contraction estimating unit executes the elongation or contraction of the spectrum on the frequency axis with a warping function defining the form of elongation or contraction by using estimation derived from the best likelihood estimation of HMM (hidden Marcov model) in cepstrum space.

28. The reference pattern learning system according to claim 6, wherein the elongation/contraction estimating unit executes the elongation or contraction of the spectrum on the frequency axis with a warping function defining the form of elongation or contraction by using estimation derived from the best likelihood estimation of HMM (hidden Marcov model) in cepstrum space.

29. The voice recognition method according to claim 18, wherein the elongation or contraction of the spectrum on the frequency axis with a warping function defining the form of elongation or contraction is executed by carrying out the elongation or contraction in cepstrum space.

30. The voice recognition method according to claim 18, wherein the elongation/contraction estimating process executes the elongation or contraction of the spectrum on the frequency axis with a warping function defining the form of elongation or contraction by using estimation derived from the best likelihood estimation of HMM (hidden Marcov model) in cepstrum space.

31. The voice recognition method according to claim 19, wherein the elongation/contraction estimating process executes the elongation or contraction of the spectrum on the frequency axis with a warping function defining the form of elongation or contraction by using estimation derived from the best likelihood estimation of HMM (hidden Marcov model) in cepstrum space.

* * * * *